United States Patent

Fang

(10) Patent No.: US 8,165,609 B2
(45) Date of Patent: Apr. 24, 2012

(54) STORAGE AND ACCESS OF DIGITAL CONTENT

(76) Inventor: Yue Fang, Mountain View, CA (US)

( * ) Notice: Subject to any disclaimer, the term of this patent is extended or adjusted under 35 U.S.C. 154(b) by 808 days.

(21) Appl. No.: 11/782,306

(22) Filed: Jul. 24, 2007

(65) Prior Publication Data

US 2009/0029680 A1      Jan. 29, 2009

(51) Int. Cl.
*H04W 4/00* (2009.01)
(52) U.S. Cl. .............. 455/466; 455/412.1; 455/412.2
(58) Field of Classification Search ............... 455/466, 455/412.2, 412.1
See application file for complete search history.

(56) References Cited

U.S. PATENT DOCUMENTS

| | | | |
|---|---|---|---|
| 2005/0060250 A1* | 3/2005 | Heller et al. | 705/34 |
| 2008/0008303 A1* | 1/2008 | Maes | 379/114.03 |
| 2008/0069440 A1* | 3/2008 | Forutanpour | 382/163 |
| 2008/0103918 A1* | 5/2008 | Burnette et al. | 705/26 |
| 2008/0154723 A1* | 6/2008 | Ferguson et al. | 705/14 |
| 2008/0301137 A1* | 12/2008 | Bauman et al. | 707/7 |
| 2011/0153849 A1* | 6/2011 | Lin et al. | 709/228 |

* cited by examiner

*Primary Examiner* — Barry Taylor
(74) *Attorney, Agent, or Firm* — Hahn Moodley LLP; Vani Moodley, Esq.

(57) ABSTRACT

In one embodiment, the invention provides a method, comprising providing a first communications channel to transmit digital content to a notes-access application for storage against a particular user, the first communications channel being selected from the group consisting of an SMS channel, an MMS channel, a fax channel, an e-mail channel, and an IM channel; responsive to receiving digital content from said user via the first communications channel storing said digital content in the database associated with said notes-access application; and providing a second communications channel to the notes-access application whereby the digital content stored by the notes-access application against said user is provided to said user, the second communications channel being selected from the group consisting of an SMS channel, an MMS channel, a fax channel, an e-mail channel, and an IM channel.

8 Claims, 2 Drawing Sheets

STORAGE AND ACCESS OF DIGITAL CONTENT

FIELD

Embodiments of the invention relate generally to the storage of digital content, e.g. digital notes, created on a handheld device such as a mobile telephone.

BACKGROUND

In the mid-1970s, Minnesota Mining and Manufacturing Company ("3M") invented a useful office product, Post-it® Notes which provides small pieces of paper for people to jot down notes. Post-it Notes® have become very popular and are used today in a myriad of ways, not only in offices but also in homes.

With the advent and penetration of computer technology and the Internet, various computer applications have come to market in an attempt to simulate the Post-it Notes®. These applications allow people to electronically create, store, and send notes.

Although these applications duplicate the function of Post-it Notes®, they do not fully exploit the modern computer's powerful ability to organize information. Generally within these applications, the notes are stored randomly. The applications do not provide much help to organize and identify the notes. People rely on these applications to create notes in a manner similar to how they created paper notes. However, they have to organize and manage those notes by themselves. Advanced note-taking applications such as the Evernote® application exist and are designed to give users a single place to store various types of notes and other information/content. The notes are accessible at any time, in any place (from a computer). Such advance-note taking applications are not limited to storing only text notes.

Although feature-rich, these advanced-note taking applications are limited as they are desktop applications designed to run on a desktop or laptop computer system. As a result, a user can only access his/her notes on the desktop/laptop computer system on which the advanced-note taking application is installed. For universal access to the notes i.e. access at any location the desktop/laptop computer system would have to be carried around. Alternatively, the notes may be saved to portable storage media, such as flash memory card or portable hard disk, which then has to be carried. The latter case does not allow access of the notes on computer systems on which the advanced-note taking application is not installed. This can be very inconvenient and frustrating.

With the advent of the World Wide Web, it became possible to develop web-based note-taking applications. One example of a web-based note-taking application includes Google® Notebook. Such web-based applications retain the basic functions of their desktop peers, but allow a user's notes to be saved on the web. So that the notes may be accessed from any location as long as there is Internet access.

A limitation common to all of the above note-taking application is that they can only be used with computers (i.e. desktop and laptop computer systems), or in some cases with smart devices such as smart phones that approximate the functions of such computers. Although portable computers such as notebooks and tablets are getting lighter and smaller, they are still quite large when compared to a cell phone. Even portable devices such a smart phones are bulky and expensive when compared to a regular cell phone. Moreover, the percentage of people that own smartphone-type devices is still quite small. To address the small screen-size of smartphone-type devices, some companies have provided scaled-down versions of their web-based note-taking applications, but as tradeoff, the functions are limited.

Another limitation of web-based note-taking applications is that they can only be used when an Internet connection is available. Additionally, some web-based note-taking applications may even require a broadband Internet connection. About 30 percent of U.S. families still did not have Internet access at home. Further, broadband adoption is still just over 50 percent. While Wi-Fi technology is being pushed heavily, public "hotspots" is still scarce, and many of them are not free. Cell phone service providers are constructing 3G or 4G networks which can support data network along with voice network. But currently those kinds of network can only cover a few metro cities. Moreover, the devices that support such networks are expensive and the service fee is still high.

On the contrary, the regular voice wireless network is by far the largest network. It covers at least 95 percent of the U.S. population. Furthermore, cell phones are by far the most popular mobile device; at least 70 percent of Americans own at least one cell phone. A vast majority of these cell phones are non-smart phone devices. Since these facts are unlikely to change in the near future, a truly universal "Post-it Notes" application that can be used by most people should incorporate the use of a regular cell phone on a regular wireless network.

SUMMARY

In one embodiment, the invention discloses a method for storing and accessing personal notes. The method comprises receiving a text message from a cell phone or a similar device via the SMS protocol, identifying a user who sent the text message, storing it on a server, and making it accessible to the user over the Internet.

A further embodiment discloses a method comprising receiving a text message from a cell phone or similar device containing a command, identifying a user who sent the text message, and responding to the command.

In another embodiment, the invention discloses a system for storing and accessing personal notes in accordance with the above method.

Other aspects of the present invention will become apparent from the detailed description below.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings, wherein:

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Although the following description contains many specifics for the purposes of illustration, one skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
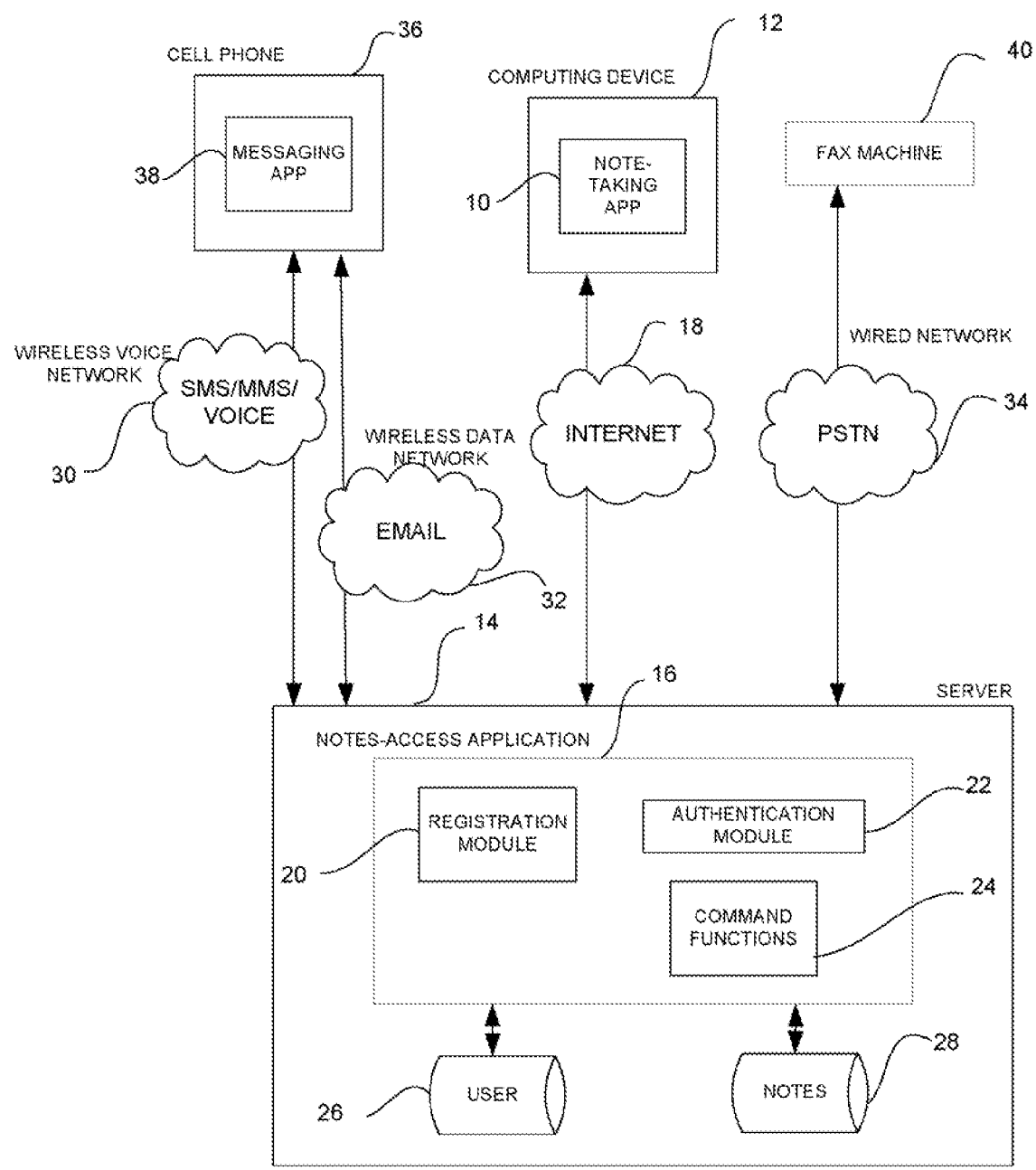
FIG. 1 shows a server comprising a notes-access application, in accordance with one embodiment of the invention.

Referring to FIG. 1 of the drawings, reference 10 indicates a note-taking application, in accordance with one embodiment of the invention. The note-taking application 10 makes it easy to store and quickly access digital content in the form of typed or handwritten memos, web page excerpts, emails, phone messages, addresses, passwords, brainstorms, sketches, documents, etc. Embodiments of the note-taking application can run on a computing device such as a desktop computer, notebook computer, a Personal Digital Assistant (PDA), a smart phone. In the case of the example of FIG. 1, the note-taking application 10 is shown installed on a desktop computer 12. The note-taking application 10 may store the digital content locally within a memory of the computing device, or remotely on a web server 14, as will be described in greater detail below. The computer 12 is able to communicate with a Web server 14 which is under control of a service provider and which implements a notes-access application 16 as will be described in greater detail below. Communications between the computer 12 and the server 14 takes place through a communications channel 18 provided by the Internet.

As will be seen, the notes-access application 16 comprises a registration module 20, and authentication module 22, and a command functions module 24. The notes-access application 16 is connected to a user database 26, and a notes database 28.

Embodiments of the invention disclose several communications channels by which digital content may be sent to the notes-access application 16 for storage in the notes database 28, as will be described in greater detail below. The communications channels include a wireless voice network 30, a wireless data network 32, and a wired network 34. The network 30 supports wireless voice communications, as well as the Short Message Service (SMS), and Multimedia Messaging Service (MMS) protocols. The network 32 is capable of supporting e-mail communications, where as the network 34 comprises a Public Switched Telephone Network (PSTN). All of the above communications channels may also be used to access notes stored in the notes-access application 16, as will be described in greater detail below.

1. SMS (Short Message Service) Channel

As a lightweight data sending protocol, SMS is implemented on almost every mobile phone, even the cheapest model. SMS messages can be carried within a regular voice wireless network, and does not need support of new generation data networks. Thus, SMS messages may be sent and received from anywhere where there is a mobile phone signal.

In one embodiment, the service provider provides one or more public phone numbers and a user will register his/her cell phone number with the service provider. In use, the user uses his/her cell phone 36 with the caller-ID function activated, to send a text message via an SMS channel through the network 30 to one of the aforementioned public phone numbers provided by the service provider. In one embodiment, all such SMS messages are forwarded to the server 14. By checking registration information the server 14 can identify the user that sent the SMS message and store the content of the message within the notes database 28. Later, when the user has access to a computer such as the computer 12 with an Internet connection, and with the note-taking application 10 installed, he/she will be able to access the text he/she sent from the cell phone 36, in the same user interface, as if the note was typed directly on computer 12.

For security reasons, the service provider may also issue a security code to each user (the security code may be chosen by the user). With the security code option, a user is required to type the security code before the content he/she wants to send as a SMS message. In this case, when the server 14 receives an SMS message from the cell phone 36, it will verify the security code before storing the SMS message for the user. In one embodiment, messages with un-verified security codes may be discarded or saved in a temporary folder, and the user may be given the option to decide if he/she wants to store the SMS message.

In one embodiment, a user may be able to access the notes stored in the database 28 through the SMS channel. In this embodiment, the user text messages a special word or command, for example, "list", to the service provider using the aforementioned public phone number. The service provider may also provide alternative public phone number(s) for this purpose. After server 14 receives any SMS message, it will check if the message includes one of the commands. In one embodiment, the server 14 may return several of the newest notes to the cell phone 36 via the SMS channel in response to receiving SMS message from the cell phone 20 with a command. In some cases, a command may be followed by one or more parameters to indicate to the server 14 to return specified notes to the cell phone 36. The notes that are returned may be the earlier SMS messages to the server 14, or notes typed using the computer 12. In the latter case, such notes would have been saved on the server 14 by sending the notes to the server 14 via the Internet. In accordance with different embodiments of the invention, different commands may be used to execute different functions on the server 14. By way of example, commands may be used to delete the last or some specific message on the server 14, to make some messages public or to re-send some messages. In some eases, before the server 14 executes a command contained in an SMS message, the SMS message must also include a security code associated with a user. In one embodiment, a user may initiate a telephone call to the server 14 and then issue a voice command to cause the server 14 to perform a function such as sending SMS messages to mobile device 36, as described above.

In one embodiment, if the cell phone 20 does not support a caller-ID function, the phone 36 is set to "private" mode, or the user has to use a phone that is not registered with the service provider, the user types the phone number that he/she registered with the service provider, with or without security code, followed by the text he/she wants to store and optionally the command the server 14 is to execute. The server 14 verifies the registered phone number contained in the SMS message and any security code before allowing access to the notes-access application 16.

It is to be understood that access to the service is possible using any device capable of sending and receiving SMS messages, not just cell phones.

2. Voice Message Channel

In one embodiment, the service provided by the notes-access application 16 is accessible through a voice telephone network defined by the wireless voice network 30, or by the PSTN 34. In this case, a user calls a public phone number provided by service provider user may call from a cell phone or a landline phone). For this embodiment, the server 14 may be provisioned with an automatic voice response system to answer the phone call. If the user calls from a phone registered with the service and the caller-ID function is activated, he/she can record a voice message. If the user calls from a phone that is not registered with the service or the caller-ID function is not activated, he/she can key in a phone number that is registered with the service under guidance of the automatic voice response system before leaving a voice message. In one embodiment, messages from all phone, whether registered or not, require a security code which must be verified by the server 14 before access to the service is allowed.

If access to the service is allowed, the server 14 allows the user to record a voice message which is stored in the database 24 of the notes-access application 16.

Using the computer 12, with the note-taking application 10 installed therein, the user is able to connect to the database 28 through the Internet 18 in order to retrieve the voice message. In one embodiment, the notes-access application 16 includes a voice recognition function to automatically convert the voice message to text format so that the voice message may be retrieved as a text message.

3. Photo Message Channel

A significant number of cell phones are equipped with a camera. A photograph taken on a cell phone with a built-in camera may be sent as a Multimedia Message (MMS) via an MMS channel supported by a wireless network 30 provided by a wireless carrier. As with the SMS messages described above, the MMS message can be sent through the regular voice network to the server 14. In operation, a user takes a picture with their camera phone, he/she can attach a text message if required and the picture is sent as an MMS message to a public phone number of the service provider. For identification purposes at the server 14, the MMS message is transmitted with the caller-ID function of the cell phone 36 activated. Thus, MMS messages from registered mobile phones can be stored against the correct user. In cases where a cell phone 36 lacks a caller-ID function, the caller-ID function is turned off or the cell phone that is used to transmit the MMS message is not registered with the service, identification of the server 14 is facilitated by having the user enter a registered phone number in the MMS message.

In one embodiment, the server 14 stores the picture (with message if attached) against the user's entry in database 28. When user later accesses the database 28 with the computer 12 via the Internet connection 18, he/she can view the picture. In one embodiment, the notes-access application 16 includes an optional character recognition function. Thus, pictures containing characters, for example, an image of a page of a book may be automatically converted to text format.

4. Fax Channel

Although an old fashion technology compared with email, fax machines are still very popular, especially in the business world. In one embodiment, access to the notes-access application 16 is provided by a fax channel.

If a user has access to a private fax machine 40, he/she can register the phone number of the fax machine with the service provider. Faxes from the registered fax machine 40 to one of the public numbers of the service provider, are mapped based on the sending number to a user and stored under the user's corresponding entry in the database 28. Faxes containing pictures containing characters may be automatically converted to text format using to a optical character recognition function.

In reality, most people do not have a private fax machine. They either use an office fax machine or one provided by an office services store. In such cases, there must be some way for server 14 to identify each incoming fax as being from a particular user. There are two possible options for such identification, in accordance with one embodiment. One option is to add the user's registered phone number, and an optional security code as described above, as an extension, when dialing the service provider's public phone number to send the fax. Thus, the server 14 can use the registered phone number and the optional security code to map that incoming fax to a particular user. Another option is to temporarily register the phone number of a public fax machine. With this option, the user calls the automatic voice response system described above from their registered phone number, and is guided to enter the phone number of fax machine that is going to be used. In one embodiment, the user can also do it from an unregistered phone number, but will be required to enter their registered phone number, so that the service provider can identify the user. In one embodiment, a fax machine may be registered with the server 14 by sending an SMS message to the server 14 with an appropriate command together with the fax number to be registered, as text. For temporarily registered phone numbers, in one embodiment, the server 14 stores incoming faxes from a fax machine with the temporarily registered number against a user in the database 24 that registered the fax machine. Temporarily registered numbers are registered for a predefined period of time, say 10 minutes after registration and for the next incoming fax or the next few incoming faxes.

In one embodiment, the server 14 allows a user to retrieve messages stored in the database 28 for that user, using a fax machine. In this embodiment, the user sends a command as at SMS message to the server 14, or as a voice command entered with the help of the automatic voice response system described above. The command may specify which messages the user wants to retrieve, as well as the receiving fax number. Responsive to receiving the command, the server 14 sends the messages to the specified fax machine as a regular fax.

5. Email Channel

In one embodiment, the invention also provides an e-mail channel through the wireless data network 32 by which the notes-access application 16 may be accessed. For this embodiment, the service provider publishes one or more public email addresses. A user registers his/her personal email address with the service provider. E-mails sent to one of the public email addresses of service provider from a mobile device, such as a smart phone, capable of sending and receiving e-mails are mapped by the server 14 based on the registered e-mail address to a particular user of the service and then stored in the database 28 against that user. For added security, a user may be required to type a security code in the e-mail, with security code which is verified by the server 14 before storage thereof. In one embodiment, commands may also be embedded within an e-mail, each command to cause the server 14 to execute a particular function. For example, a user can send a 'get' command to the server 14 within an e-mail.

This command will cause the server 14 to email back a few most recent or some specific content back to user.

6. IM (Instance Messenger) Channel

In one embodiment, access to the notes-access application 16 may be provided by an IM channel implemented using the wireless data network 32. In this case the service provider publishes one or more messenger IDs. A user registers their messenger ID with the service provider. Messages sent by the user using the registered messenger ID are mapped by the server 14 to the user and content associated with the message is stored against the user in the database 28. As in the case of e-mail messages, IM messages may include security codes and commands.

Embodiments of the present invention also disclose a system and techniques for accessing an online database of personal notes via a cellular phone using the SMS text message protocol. In accordance with these techniques, a SMS text message is received by the system, its phone number of origin is compared with a database of registered users to identify who sent it, and the body of the text message is then entered into a message database on a server accessible to registered users over the Internet. The server can also respond to commands sent via the SMS text message protocol by modifying the data within the database or sending text messages to a user's cellular phone. This makes the database accessible to users regardless of whether they are near a computer.

In one embodiment, the server 14 receives SMS text messages from the mobile device 36, identifies the user using the authentication module 22 (in one embodiment, by comparing a phone number from which a text message originates with information in user database 26 comprising phone numbers provided by registered users of the system), and enters the text message into notes database 28. The notes in the notes database 28 can then be accessed via the Internet 18, using the computer 12, as described above.

In another embodiment, if a text message sent by a user contains a command that is supported by the command functions 24, the server 14 responds to the command by modifying the data in the notes database 28, in accordance with the command or by sending a SMS text message containing requested information to a user's mobile device 36. For example, the system can respond to a command of "list" by sending the user a SMS text message containing a list of all the notes in the user's account. The command database can also include a command for deleting notes, a command for displaying notes entered at a particular time or date, etc.

In one embodiment, the user database 26 comprises user phone numbers. The authentication module 22 would then identify a phone number from which a text message originates and search for that phone number in the user database 26. The user database 26 may also, in another embodiment, comprise passwords as well as phone numbers, to enable greater security for the users' data. In that embodiment, the authentication module 22 would identify a phone number from which a text message originates, search for that phone number in the user database 26 and then identity the password corresponding to the phone number in the user database 26 and look for that password in the body of the text message. If the text message does not contain the correct password, it is rejected by the system.

A text message that is properly authenticated by the authentication module 22 is then, in one embodiment of the invention, analyzed by the command functions module 24 to determine whether or not it contains a recognized command. If the command functions module 24 determines that the text message contains a recognized command then the command is executed. If the text message does not contain a recognized command, in one embodiment, the command may simply be ignored. Various additional data can be entered into the notes database 28 along with the body of the message—for example, a date/time stamp can be entered along with each message.

As will be appreciated, embodiments of the invention require that each user be pre-registered on the system. For example, a user can create an account online, entering his or her phone number and (in some embodiments) a password. Accounts can also be automatically created, if the system adds each phone number it does not recognize to the user database and creates a new account.

Figure 2:
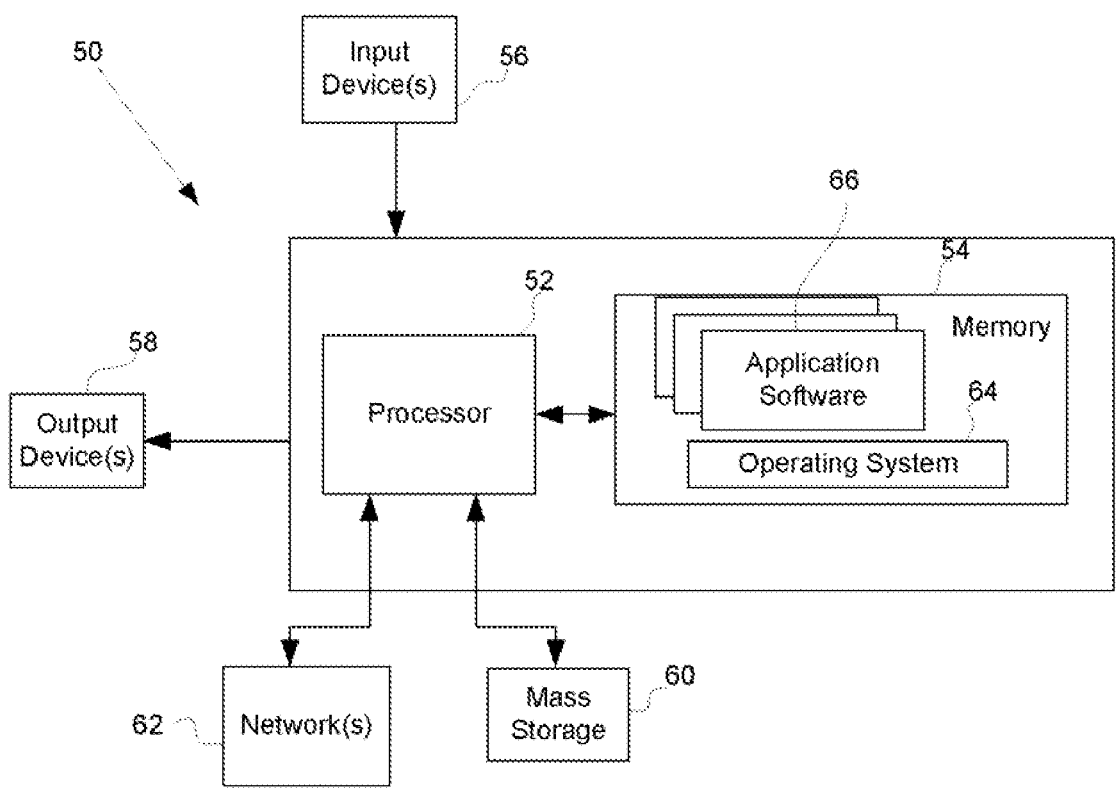
FIG. 2 shows an exemplary hardware for implementing the server of FIG. 1

FIG. 2 of the drawings shows an example of hardware 50 that may be used to implement the server 14, or the computing device 12, in accordance with one embodiment of the invention. The hardware 50 typically includes at least one processor 52 coupled to a memory 154. The processor 52 may represent one or more processors (e.g., microprocessors), and the memory 54 may represent random access memory (RAM) devices comprising a main storage of the hardware 50, as well as any supplemental levels of memory e.g., cache memories, non-volatile or back-up memories (e.g. programmable or flash memories), read-only memories, etc. In addition, the memory 54 may be considered to include memory storage physically located elsewhere in the hardware 50, e.g. any cache memory in the processor 52 as well as any storage capacity used as a virtual memory, e.g., as stored on a mass storage device 60.

The hardware 500 also typically receives a number of inputs and outputs for communicating information externally. For interface with a user or operator, the hardware 50 may include one or more user input devices 56 (e.g., a keyboard, a mouse, heart rate monitor, camera, etc.) and a output devices 58 (e.g., a Liquid Crystal Display (LCD) panel).

For additional storage, the hardware 50 may also include one or more mass storage devices 60, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 70 may include an interface with one or more networks 62 (e.g., a local area network (LAN), a wide area network (WAN), a wireless network, and/or the Internet among others) to permit the communication of information with other computers coupled to the networks. It should be appreciated that the hardware 50 typically includes suitable analog and/or digital interfaces between the processor 52 and each of the components 54, 56, 58, and 62 as is well known in the art.

The hardware 50 operates under the control of an operating system 64, and executes various computer software applications, components, programs, objects, modules, etc. to implement the notes-access application 16, or the note-taking application 10, described above. Moreover, various applications, components, programs, objects, etc., collectively indicated by reference 76 in FIG. 2, may also execute on one or more processors in another computer coupled to the hardware 50 via a network 62, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

The invention claimed is:

1. A method comprising:
   receiving notes by a web-based notes access application installed on a web server via a communication channel whereby a user can send a note to the web-based notes access application via the communication channel, wherein the communication channel comprises at least one of a fax channel, a Multimedia Messaging Service (MMS) channel, a Short Messaging Service (SMS) channel, an email channel, and an Instant Messaging (IM) channel, and a telephone channel;
   saving each note sent via the communication channel separately in one of a temporary folder and a permanent folder within a storage area assigned to the user on the web server;
   wherein the note is stored in the permanent folder when a security code associated with the note is verified, and wherein the note is stored in the temporary folder when the security code is unverified; and
   allowing a local notes taking application installed on a computer of the user access to the saved notes so that the user can access each note in a user interface of the local notes taking application as though the note was first entered using the computer and said user interface.

2. The method of claim 1, wherein the telephone channel is used for sending the note as a voice call.

3. The method of claim 2, further comprising converting the voice call to a text format message, wherein the text format message is saved as the note within the storage area.

4. The method of claim 1, wherein the MMS channel is used for sending the note as an image.

5. The method of claim 4, further comprising converting the image to a text format message using an Optical Character Recognition (OCR) technique, wherein the text format message is saved as the note within the storage area.

6. The method of claim 1, further comprising receiving a text message containing at least one command, wherein the at least one command executes a plurality of functions on the web server, wherein the plurality of functions comprises at least one of editing existing notes and publishing existing notes on the web server.

7. A method comprising:
   receiving notes by a web-based notes access application installed on a web server via a Short Messaging Service (SMS) channel whereby a user can send a note to the web-based notes access application via the SMS channel;
   saving each note sent via the SMS channel separately in one of a temporary folder and a permanent folder within a storage area assigned to the user on the web server;
   wherein the note is stored in the permanent folder when a security code associated with the note is verified, and wherein the note is stored in the temporary folder when the security code is unverified; and
   allowing a local notes taking application installed on a computer of the user access to the saved notes so that the user can access each note in a user interface of the local notes taking application as though the note was first entered using the computer and said user interface.

8. The method of claim 7, further comprising receiving a text message containing at least one command, wherein the at least one command executes a plurality of functions on the web server, wherein the plurality of functions comprises at least one of editing existing notes and publishing existing notes on the web server.

* * * * *